(12) United States Patent
French et al.

(10) Patent No.: US 6,330,601 B1
(45) Date of Patent: Dec. 11, 2001

(54) MANAGEMENT SYSTEM FOR A MULTI-LEVEL COMMUNICATION NETWORK

(75) Inventors: Carolyn Anne French, Ottawa; Pierre Goyer, Gatineau, both of (CA)

(73) Assignee: Nortel Networks Limited, St-Laurent (CA)

( * ) Notice: Subject to any disclaimer, the term of this patent is extended or adjusted under 35 U.S.C. 154(b) by 0 days.

(21) Appl. No.: 09/218,360

(22) Filed: Dec. 22, 1998

(51) Int. Cl.$^7$ .................................................. G06F 15/173
(52) U.S. Cl. ............................................. 709/223; 709/224
(58) Field of Search .................................. 709/223, 224, 709/225, 220, 246

(56) References Cited

U.S. PATENT DOCUMENTS 5,680,552 * 10/1997 Netravali et al. .................... 709/220
6,085,234 * 7/2000 Pitts et al. ............................ 709/217
6,145,001 * 11/2000 Scholl et al. ......................... 709/223

* cited by examiner

Primary Examiner—Ario Etienne

(57) ABSTRACT

A communication network management system for integrating two network management systems working together in a client/server manner to provide an integrated view of a multi-layer, multi-technology network. The invention provides a novel interface module that permits a network management system to represent different logical levels in a communication system. For instance, one logical level of the communication system could be the transport network while another logical level is the data network. The main advantages of the invention is that it provides to a network administrator a system which permits management of two levels of a networks a data network to tell how the two networks are integrated and what the entire topology is, and therefore renders it possible to manage both networks through the same system.

13 Claims, 3 Drawing Sheets

MANAGEMENT SYSTEM FOR A MULTI-LEVEL COMMUNICATION NETWORK

FIELD OF THE INVENTION

The present invention relates to a communication network management system. The novel system is particularly useful for integrating two or more network management systems working together in a client/server manner to provide an integrated view of a multi-layer, multi-technology network.

BACKGROUND OF THE INVENTION

Management functions (visualizing, monitoring, configuring, etc.) for multi-level networks using state-of-the-art communication network management systems is performed by a separate management system for each level of the network. That is, present network management systems do not manage multiple levels of a network. For example, the data network level (e.g. IP, Ethernet) is managed by systems such as HP OpenView™ or Cabletron Spectrum™ while transport network level (e.g., SONET, ATM or SDH) are managed by other technology-specific management systems.

The problem lies in the fact that a network administrator managing a data network which has, for example, SONET as its backbone, either cannot manage the backbone or has to use two different management systems to do so. A data management system may show a single link between two routers when in fact there may be an entire SONET network. It is therefore not presently possible to tell how the two networks are integrated and what the entire topology is, and therefore not possible to manage both networks through the same system.

Thus, there exists a need in the industry to provide an integrated system for managing multi-level communication networks.

SUMMARY OF THE INVENTION

The invention provides a novel interface module that permits a network management system to represent different logical levels in a communication system. For instance, one logical level of the communication system could be the transport network while another logical level is the data network.

In a preferred embodiment, the interface module is implemented on a general purpose computing device including a processor, memory and a mass storage device. Functionally, the interface includes:

a) an input allowing data to be exchanged between the interface module and a transport network management system;

b) an output allowing data to be exchanged between the interface module and a data network management system; and c) conversion functional block that accepts as input the data received from the first interface, effects the necessary translation and passes the data to the output;

In a specific example, the transport network may be a SONET network and the transport management system uses a CORBA protocol. Thus, the interface module is designed to accept CORBA based communication messages. The data network management system uses the Simple Management Protocol (SNMP). The conversion functional block receives the CORBA based messages and translates them into the SNMP format. The conversion functional block operates in conjunction with a Management Information Base (MIB) which contains a model of and information about the transport network, and is accessible to the data network management system via the output of the interface module.

Thus the interface module, with the SNMP interface (agent) and MIB, appears to the data network management system like any other data device with an SNMP interface in the data network, and allows the transport network that the interface module is representing to be managed like any other data device in the data network.

The interface module may optionally include filtering capabilities to ignore events and conditions in the data management network that should not be displayed or available on the data network management system, in the case of the transport network customer. This feature can be implemented by using a configuration file in the interface module specifying the events and conditions to monitor and those to disregard.

DESCRIPTION OF A PREFERRED EMBODIMENT

Figure 1:
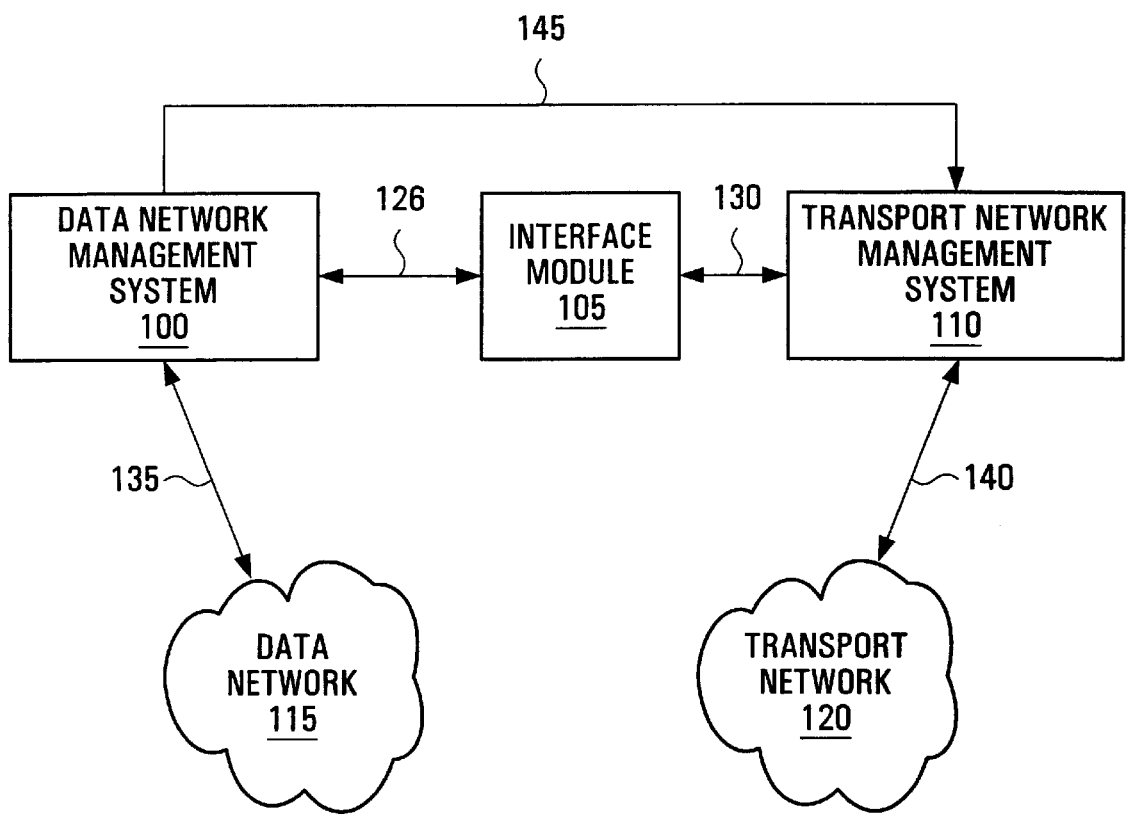
FIG. 1 is a block diagram showing a network management system arrangement including the interface module in accordance with an embodiment if the invention.

FIG. 1 is a block diagram showing a network management system arrangement including the interface module 105 in accordance with an embodiment of the invention.

The data network management system 100 is used to view, diagnose, correct, and configure the data network 115. A bi-directional data link 135 enables information transfer between the data network 115 and the data network management system 100.

The data network management system 100 possesses a Graphical User Interface (GUI) (not shown), which is a portion of the overall program element executed by the processor that can present the necessary information to an operator on a display device for viewing information about the networks 115 and 120, and accept commands from an input device such as a mouse and/or a keyboard for navigating on and/or entering instructions to the data network management system 100. The level of interaction and control over the networks (115 and 120) depends on the type of operator (network operators or transport network customer) utilizing the management system. This is determined by the user specific filter 310 of FIG. 3 described below.

The main functions of the data network GUI are as follows:

1. To display an abstraction of the data network 115 and connections in the data network view;
2. To manage and configure the data network 115;
3. To display an abstraction of the transport network 120 and connections in the data network view;
4. To display the physical correlation between the data network 115 and the transport network 120;
5. To show the logical correlation between the data network 115 and the transport network 120;

6. To display transport network 120 alarms and some alarm details in the data network 115 view;
7. To maintain a log of transport network 120 alarms in the data network 115 view (in memory 215);
8. To enable the launch of the transport network UI 400 from the data network UI 200 to allow for more detail on the transport network 120 connections.

Ultimately, the data network GUI is used for various management functions of both the data network 115 and the transport network 120. In order for any type of user to launch the transport network management system user interface (not shown) while viewing the transport network information on the data network UI 200, a script is added to the memory (not shown) of the data network management system 100. This script will cause a window on the user's terminal to open and display the information from the transport network UI with the appropriate class of user (admin, read-only, etc.).

The uni-directional data link 145 is provided to launch the transport network management system user interface. It therefore sends information from the data network management system 100 to the transport network management system 110.

The data network management system 100 also includes a model database (not shown) which obtains and stores network information. The model database contains models of the actual network devices (not shown) and their interactions. These models reflect and poll the live network 115, and draw one comprehensive conceptualization of it.

A model is created for the transport network 120, based on the MIB 305. The information held with the model will include the attributes associated with the transport network 120, which it gets from polling the MIB 305 in the interface module 105. The transport network 120 is therefore modeled like devices in the data network.

The transport network management system 110 is used to view, diagnose, correct, and configure the transport network 120. A bi-directional data link 140 enables information transfer between the transport network 120 and the transport network management system 110. The transport network management system 110 gathers information (such as configuration and alarms) from the transport network 120 and forwards them, via the interface module 105, to the data network management system 100. The transport network management system 110 includes open interfaces (not shown), which are used to provide information about the transport network 120. The open interfaces comprise a resource management open interface (not shown) that is used to provision the interface module 105. This open interface provides physical configuration information about the transport network 120 required to provide the Management Information Base (MIB) 305 (see FIG. 3) with the information needed by the data network management system 100 to create its topology view. The resource management open interface also contains customer connection information required for alarm filtering and correlation for the transport network customer.

The interface module 105 provides the main link between the data network management system 100 and the transport network management system 110 via the communication links 125 and 130. In an embodiment of the invention, the protocol used over link 125 is an open protocol such as the Simple Network Management Protocol (SNMP), and the protocol used over link 130 is the Common Object Request Broker Architecture (CORBA). Both of these protocols are known to the person skilled in the art and no additional description thereof is necessary here. It should also be noted that different protocols could be used without departing from the spirit of the invention.

In the configuration described in FIG. 1, the two network management systems (110 and 100) still operate independently from each other; that is, the data network management system 100 is still used for managing the data network 115 (higher network level), and the transport network management system 110 is still used for managing the transport network 120 (lower network level). It is the interface module 105 that is used to extract data from the transport network management system 110 over a bi-directional data link 130 and export it to the data network management system 100 via an open interface bi-directional data link 125.

Figure 2:
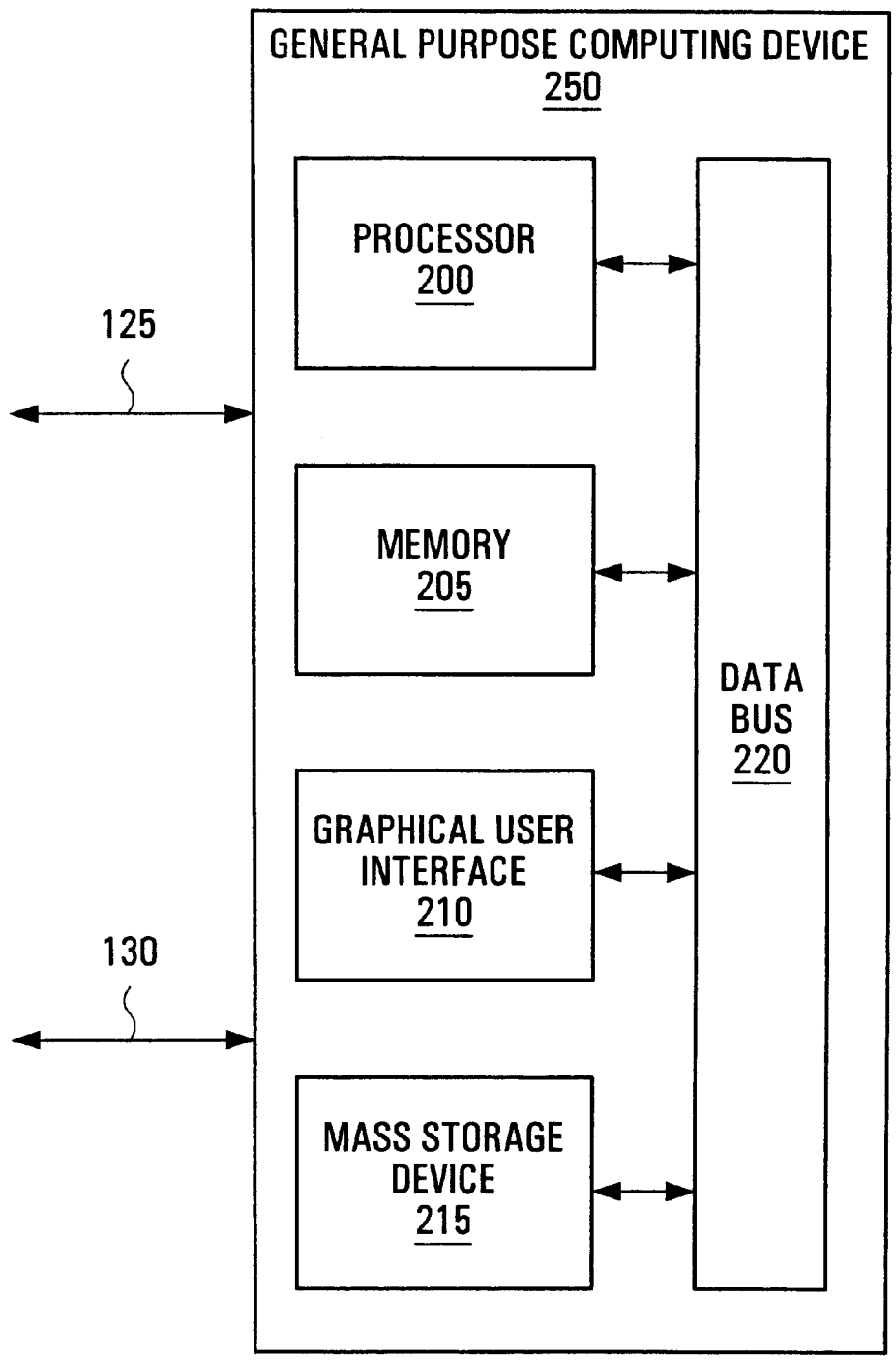
FIG. 2 is a block diagram showing a general purpose computing device on which the novel interface module is implemented in accordance with an embodiment of the invention.

FIG. 2 is a block diagram showing a general purpose computing device 250 on which the novel interface module 105 is implemented in accordance with an embodiment of the invention. The general purpose computing device 250 includes a processor 200, a memory 205, a Graphical User Interface (GUI) 210, a mass storage device 215, and a bus 220 for internal communications between each of the above components.

Figure 3:
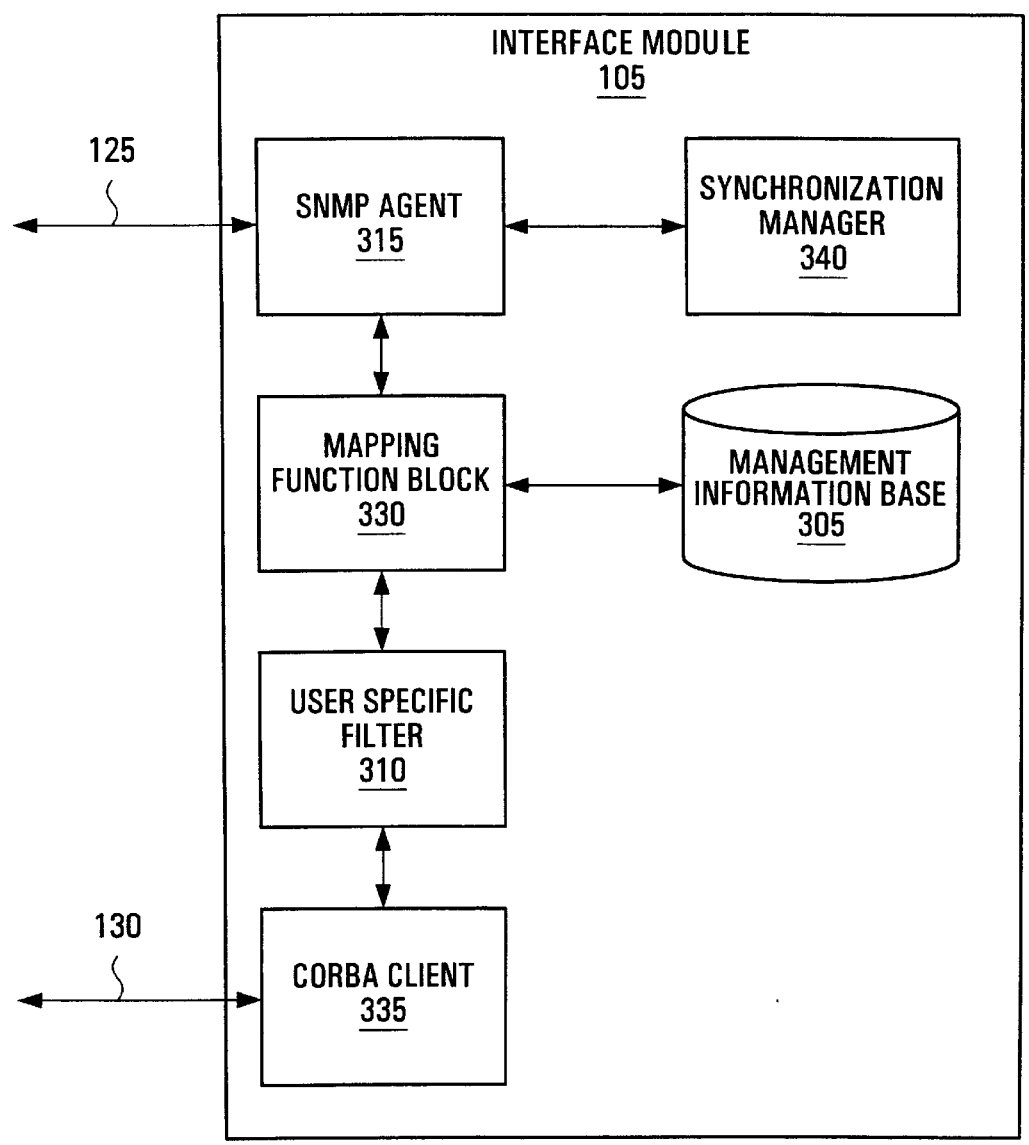
FIG. 3 is a block diagram the main functional elements of an interface module in accordance with an embodiment of the invention.

The memory 205 is used for storing the software necessary to implement the functional blocks of the interface module 105 as described in FIG. 3. Memory 205 is also used for buffering packets of information when they are sent out to or received from external components.

The processor 200 also runs all other software required for the internal workings of the general purpose computing device 250. For example, it controls flow of information on bus 220 and determines which software has priority in different situations.

The GUI 210 offers a simple command line interface that is used to configure the general purpose computing device 250 in order to meet the needs of the customer or network operator. The GUI 210 commands are organized into a series of directories through which a user navigates by entering the directory names. In an embodiment of the invention, a user may navigate in the following directories: alarm, manager, operator, customer and administration.

The mass storage device 215 is used for applications such as databases. For example, the management information base 305 would be stored here.

FIG. 3 is a block diagram of the main functional elements of interface module 105 in accordance with an embodiment of the invention. The functional elements include an SNMP agent 315, a conversion functional block 330, a user specific filter 310, a synchronization manager 340, a CORBA client 335, and a MIB 305.

The interface module 105 communicates with external components via two input/output lines (125 and 130). Input/output 125 is used for communication with the data network management system 100 while input/output 130 for communication with the transport network management system 110.

The interface module 105 acts as an information source for the data network management system 100 thereby representing the transport network 120. The interface module 105 is responsible, among other things, for retrieving fault management information using the fault management open interfaces (from the transport network management system open interfaces (not shown)) and populating its own MIB 305 with configuration information The interface module 105 uses a network level information model as a means to represent the transport network 120 in the MIB 305. Upon initialization of the interface module 105, the network topology is created from configuration information obtained from the resource management open interfaces to obtain an MIB 305 network level model to represent the transport network 105. A model of customer services (in the form of network connectivity) is then created from information retrieved from the Transport Network Management System 110 or from Operator input and stored in the MIB 305. The SNMP agent 315 is then put into an active state (listening for SNMP calls). While the SNMP agent 315 is in an active state, information is obtained from the transport network management system open interfaces (not shown) via interface line 130 and is translated into the MIB 305 network model. The fault information obtained is correlated to customer services and the SNMP agent 315 sends some unsolicited information (traps) to the data network management system 100 that monitors the interface module agent. This fault information is also stored in the MIB 305 for future reference.

The CORBA client 335 interfaces with the fault management open interface (not shown) from the transport network management system open interfaces (not shown) in order to retrieve alarms from the transport network 120. The retrieved alarms are then forwarded to the user specific filter portion 310 for further processing.

The user specific filter 310 has two main responsibilities. First, it provides information to populate the MIB 305. This involves providing information for modeling the network and information specifying customer services (e.g., connectivity information). Second, it correlates fault information received from the CORBA client 335 to customer services and propagates this information "up" to the SNMP agent 315.

The user specific filter 310 receives alarms from the CORBA client 335 and correlates them with a particular customer service. The specific customer's connection detailing their services across the transport network 120 is stored in the MIB 305. Only service-affecting alarms are forwarded to the SNMP agent 315 for the transport network customer cases. In the case of the network operators, they are interested in all the alarms so all of them are sent to the SNMP agent 315.

In the embodiment of the invention, the conversion functional block 330 reads the packet in CORBA format, accesses the MIB 305 and builds new data packets in the SNMP format.

The SNMP agent 315 has various responsibilities. First, it provides an interface with the data network management system 100. Second, the SNMP agent 315 maintains the MIB 305, and third, it provides a configuration interface.

Before running the interface module 105, a network configuration file needs to be setup, indicating transport network 120 topology. As well, each specific customer must have their own configuration file, which contains basic customer information and service information for their connections. This information is forwarded to the SNMP agent 315 to be recorded in the MIB 305. This also allows the interface module 105 to correlate alarms to specific customer's services, thus also allowing it to filter out alarms that are not affecting the specified customer's connections.

The configuration files are setup by the computer group administrator and are not changeable by the computer group users. The configuration files are read in from a directory specified in an environment variable. In order to obtain the specific information required in the configuration files, the transport network management open interfaces (not shown) are used. The various identifiers and values for the transport network 120 model obtained from the resource management open interface are recorded in the configuration files.

The transport network customer users wish to see only the alarms that affect their service. Therefore, the interface module 105 needs to correlate the service affecting alarms it receives against a customer's connections. Upon receiving alarms from the CORBA client 335, the user specific filter 310 uses the information in the MIB 305 to determine if each alarm is service-affecting or not. Those that are service affecting are passed up to the SNMP agent 315, indicating which particular service is affected. Those alarms that are not service affecting are ignored.

In order to correlate the alarm information to certain services, transport network object identifiers need to be obtained using the transport network management open interfaces (not shown). These transport network object identifiers are matched up with identifiers used by the SNMP agent 315. When an alarm is received, the user specific filter 310 looks at the object and the alarm itself to determine if it is service affecting, and if it is, translate that object identifier into a corresponding one for the SNMP agent 315 to indicate that a certain service has an alarm on it. This also applies to the computer group administrator case, except that in that case, they are interested in service-affecting alarms for all customers, and not just one.

In the case of the network operators, recall that all alarms are passed to the user specific filter 310, not just the service affecting alarms. The user specific filter 310 still correlates the alarm information to services, so that this can be displayed in the data network management system 100. However, this applies only to the service affecting alarms. The rest of the alarm types are simply passed up to the SNMP agent 315 without any correlation performed.

The SNMP agent 315 lies above the user specific filter 310 and interfaces with the data network management system 100. The SNMP agent 315 is responsible for responding to SNMP requests and processing alarms sent up from the user specific filter 310.

The MIB 305 used by the SNMP agent 315 is divided into two portions (i.e., the network model and the trap MIB. The network model MIB is responsible for the transport network 120 model, connectivity contained in the transport network 120 and logging transport network traps; on the other hand the trap MIB is responsible for the definition of the traps and keeping track of which data network management systems are registered to receive the traps. The MIB 305 provides a means to disable SNMP set commands and the sending of traps. The disabling of SNMP set commands is a feature that would prevent unauthorized setting of MIB variables (some added security for SNMP agents). The disabling of the sending of traps is useful in preventing network congestion.

The MIB 305 can also be configured dynamically from the resource management open interface, with some operator intervention to help set it up (e.g., telling the interface module 103 about which connections it needs to get information).

Since the interface module 105 provides a management interface and the network operator defined MIB shares information with the transport network customer defined MIB, some agency to synchronize the data is desirable. To provide this service there is a background process running that is dedicated to synchronizing the transport network customer users MIB with the network operator MIB. This is achieved via the synchronization manager 340. Upon modification of data in the transport network customer user MIB, an SNMP trap is sent to the synchronization manager 340 to inform it that a change has occurred. The SNMP trap contains information on the variable that was changed, the new value, and the interface module 105 instance that sent the trap. The synchronization manager 340 is then responsible for performing the appropriate SNMP set operations on the network operator MIB to make the interface module 105 instances synchronized (in terms of the modifiable information). An example of a interface module command that would cause this process, is the modification of a contact person in the transport network customer user MIB.

In another embodiment of the invention, an interface module 105 may support several MIBs 105 with their corresponding SNMP agents at the same time. This embodiment is made possible by using SNMP master and subagents (not shown). By using the extensible agent architecture the traffic between the master and subagents is greatly reduced over a proxy configuration. The master agent uses an extensible agent protocol to communicate with the subagents as opposed to a proxy configuration that would use SNMP to communicate.

The master agent is responsible for taking care of the SNMP security and passing the correct type of message to the subagent depending on the type of incoming instructions. The master agent is also responsible for relaying unsolicited information (from the subagents) to the appropriate network management system.

The subagents are responsible for managing their respective MIBs. By managing the MIBs, the subagents are responsible for handling requests from the master agent (which in turn is handling a data management system's request), from the user specific filter 310 and the GUI 210. The master agent will send SNMP instructions to the subagents and the subagents are responsible for the processing of the SNMP instructions and placing the information into the MIBs. Upon initialization of the interface module 105, the user specific filter 310 will send information up to the subagent to be placed in the MIB 305.

The above description of a preferred embodiment of the present invention should not be read in a limitative manner as refinements and variations are possible without departing from the spirit of the invention. The scope of the invention is defined in the appended claims and their equivalents.

We claim:

1. An interface module permitting a first network level management system to represent at least two different logical levels of a multi-level communication system, namely a first network level and a second network level, the first network level management system capable of receiving data from the first network level representative of events and conditions in the first network level, the data from the first network level being established according to a first protocol, said interface module including:

an input for receiving data from a second network level management system representative of events and conditions in the second network level, the data from the second network level being established according to a second protocol;

conversion functional block responsive to reception of data at said input for translating the data at said input into data according to the first protocol;

an output for releasing the data according to the first protocol, the data according to the first protocol being suitable for processing by the first network level management system permitting the first network level management system to provide a representation of the first network level and at least a portion of the second network level.

2. An interface as defined in claim 1, wherein the second network level is a transport network level.

3. An interface as defined in claim 2, wherein the first network level is a data network level.

4. An interface as defined in claim 2, wherein the second protocol is CORBA.

5. An interface as defined in claim 3, wherein the first protocol is SNMP.

6. An interface as defined in claim 3, comprising a filtering functional block between said input and said conversion functional block, said filtering block discarding data indicative of selected events and conditions conveyed at said input to prevent representation of the selected events and conditions at the first network level management system.

7. An interface as defined in claim 6, comprising a management information database for storing a model of the second system, said conversion functional block being in operative relationship with said management information database for translating the data at said input into data according to the first protocol.

8. A method for representing at least two different logical levels of a multi-level communication system on a first network level management system, namely a first network level and a second network level, the first network level management system capable of receiving data from the first network level representative of events and conditions in the first network level, the data from the first network level being established according to a first protocol, said interface module including:

receiving data from a second network level management system representative of events and conditions in the second network level, the data from the second network level being established according to a second protocol;

translating the data at said input into data according to the first protocol;

outputting the data according to the first protocol, the data according to the first protocol being suitable for processing by the first network level management system permitting the first network level management system to provide a representation of the first network level and at least a portion of the second network level.

9. A method as defined in claim 8, wherein the second network level is a transport network.

10. A method as defined in claim 9, wherein the first network level is a data network.

11. A method as defined in claim 9, wherein the second protocol is CORBA.

12. A method as defined in claim 10, wherein the first protocol is SNMP.

13. A method as defined in claim 10, comprising the step of filtering data received from the second network level management system to discard data indicative of selected events and conditions to prevent representation of the selected events and conditions at the first network level management system.

* * * * *

UNITED STATES PATENT AND TRADEMARK OFFICE
CERTIFICATE OF CORRECTION

| | |
|---|---|
| PATENT NO. | : 6,330,601 B1 |
| APPLICATION NO. | : 09/218360 |
| DATED | : December 11, 2001 |
| INVENTOR(S) | : Carolyn Anne French et al. |

It is certified that error appears in the above-identified patent and that said Letters Patent is hereby corrected as shown below:

In Item [75] (Inventors) of the Title page of the Letters Patent please add:

Matthew B. UPTON, Orleans (CA)

Signed and Sealed this

Seventh Day of August, 2007

JON W. DUDAS
*Director of the United States Patent and Trademark Office*